US010078435B2

(12) United States Patent
Noel

(10) Patent No.: US 10,078,435 B2
(45) Date of Patent: Sep. 18, 2018

(54) SYSTEMS, METHODS, AND COMPUTER PROGRAM PRODUCTS FOR INTERACTING WITH ELECTRONICALLY DISPLAYED PRESENTATION MATERIALS

(71) Applicant: THALMIC LABS INC., Kitchener (CA)

(72) Inventor: Elliott W. G. Noel, Mississauga (CA)

(73) Assignee: THALMIC LABS INC., Kitchener (CA)

(*) Notice: Subject to any disclaimer, the term of this patent is extended or adjusted under 35 U.S.C. 154(b) by 0 days.

(21) Appl. No.: 15/133,091

(22) Filed: Apr. 19, 2016

(65) Prior Publication Data

US 2016/0313899 A1  Oct. 27, 2016

Related U.S. Application Data

(60) Provisional application No. 62/152,151, filed on Apr. 24, 2015.

(51) Int. Cl.
*G06F 3/033* (2013.01)
*G09G 5/08* (2006.01)
(Continued)

(52) U.S. Cl.
CPC .......... *G06F 3/04845* (2013.01); *G06F 3/017* (2013.01); *G06F 2203/04806* (2013.01)

(58) Field of Classification Search
CPC .................. G06F 3/04845; G06F 3/017; G06F 2203/04806
See application file for complete search history.

(56) References Cited

U.S. PATENT DOCUMENTS 1,411,995 A   4/1922  Dull
3,620,208 A   11/1971 Higley et al.
(Continued)

FOREIGN PATENT DOCUMENTS

CN   102246125 A   11/2011
DE   44 12 278 A1   1/1995
(Continued)

OTHER PUBLICATIONS

Communication pursuant to Rule 164(1) EPC, dated Sep. 30, 2016, for corresponding EP Application No. 14753949.8, 7 pages.
(Continued)

*Primary Examiner* — Srilakshmi K Kumar
*Assistant Examiner* — Brent D Castiaux
(74) *Attorney, Agent, or Firm* — Seed IP Law Group LLP

(57) ABSTRACT

Systems, methods, and computer program products for interacting with electronically displayed presentation materials are described. A display system includes, at least, a digital processor, an electronic display, and a non-transitory processor-readable storage medium into which is loaded a computer program product that includes, at least, processor-executable instructions and/or data. The processor-executable instructions and/or data, when executed by the processor, cause the display system to respond to user inputs indicative of pointer commands and magnification setting commands. In response to such commands, the display system causes; i) a dynamic cursor to display over top of content on the electronic display; and ii) a digital copy image of the content to be displayed over top of the content on the electronic display, the digital copy image displayed at a greater magnification level than the content.

19 Claims, 9 Drawing Sheets

(51) Int. Cl.
*G06F 3/0484* (2013.01)
*G06F 3/01* (2006.01)

(56) References Cited

U.S. PATENT DOCUMENTS

| | | |
|---|---|---|
| 3,880,146 A | 4/1975 | Everett et al. |
| 4,602,639 A | 7/1986 | Hoogendoorn et al. |
| 4,705,408 A | 11/1987 | Jordi |
| 4,817,064 A | 3/1989 | Milles |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,482,051 A | 1/1996 | Reddy et al. |
| 5,605,059 A | 2/1997 | Woodward |
| 5,683,404 A | 11/1997 | Johnson |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,720,984 B1 | 4/2004 | Jorgensen et al. |
| 6,743,982 B2 | 6/2004 | Biegelsen et al. |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,809,435 B1 | 10/2010 | Ettare et al. |
| 7,844,310 B2 | 11/2010 | Anderson |
| 7,870,211 B2 | 1/2011 | Pascal et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,355,671 B2 | 1/2013 | Kramer et al. |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,447,704 B2 | 5/2013 | Tan et al. |
| 8,467,270 B2 | 6/2013 | Gossweiler, III et al. |
| 8,469,741 B2 | 6/2013 | Oster et al. |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,883,287 B2 | 11/2014 | Boyce et al. |
| 8,895,865 B2 | 11/2014 | Lenahan et al. |
| 8,912,094 B2 | 12/2014 | Koo et al. |
| 8,922,481 B1 | 12/2014 | Kauffmann et al. |
| 8,954,135 B2 | 2/2015 | Yuen et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,086,687 B2 | 7/2015 | Park et al. |
| D736,664 S | 8/2015 | Paradise et al. |
| 9,146,730 B2 | 9/2015 | Lazar |
| D741,855 S | 10/2015 | Park et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| D747,714 S | 1/2016 | Erbeus |
| D750,623 S | 3/2016 | Park et al. |
| D751,065 S | 3/2016 | Magi |
| 9,299,248 B2 | 3/2016 | Lake et al. |
| D756,359 S | 5/2016 | Bailey et al. |
| 9,367,139 B2 | 6/2016 | Ataee et al. |
| 9,372,535 B2 | 6/2016 | Bailey et al. |
| 9,393,418 B2 | 7/2016 | Giuffrida et al. |
| 9,418,927 B2 | 8/2016 | Axisa et al. |
| 9,439,566 B2 | 9/2016 | Arne et al. |
| 9,472,956 B2 | 10/2016 | Michaelis et al. |
| 9,477,313 B2 | 10/2016 | Mistry et al. |
| 9,529,434 B2 | 12/2016 | Choi et al. |
| 2002/0032386 A1 | 3/2002 | Sackner et al. |
| 2002/0077534 A1 | 6/2002 | DuRousseau |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2004/0073104 A1 | 4/2004 | Brun del Re et al. |
| 2004/0194500 A1 | 10/2004 | Rapport |
| 2004/0210165 A1 | 10/2004 | Marmaropoulos et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2007/0132785 A1 | 6/2007 | Ebersole, Jr. et al. |
| 2008/0136775 A1 | 6/2008 | Conant |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0102580 A1 | 4/2009 | Uchaykin |
| 2009/0109241 A1 | 4/2009 | Tsujimoto |
| 2009/0147004 A1* | 6/2009 | Ramon .............. G06T 3/40 345/428 |
| 2009/0179824 A1 | 7/2009 | Tsujimoto et al. |
| 2009/0189867 A1 | 7/2009 | Krah et al. |
| 2009/0251407 A1 | 10/2009 | Flake et al. |
| 2009/0258669 A1 | 10/2009 | Nie et al. |
| 2009/0318785 A1 | 12/2009 | Ishikawa et al. |
| 2010/0041974 A1 | 2/2010 | Ting et al. |
| 2010/0280628 A1 | 11/2010 | Sankai |

(56) References Cited

U.S. PATENT DOCUMENTS

| | | |
|---|---|---|
| 2010/0293115 A1 | 11/2010 | Seyed Momen |
| 2010/0317958 A1 | 12/2010 | Beck et al. |
| 2011/0018754 A1 | 1/2011 | Tojima et al. |
| 2011/0072510 A1* | 3/2011 | Cheswick .............. G06F 3/0481 726/18 |
| 2011/0134026 A1 | 6/2011 | Kang et al. |
| 2011/0166434 A1 | 7/2011 | Gargiulo |
| 2011/0172503 A1 | 7/2011 | Knepper et al. |
| 2011/0181527 A1* | 7/2011 | Capela ................ G06F 3/04845 345/173 |
| 2011/0213278 A1 | 9/2011 | Horak et al. |
| 2011/0224556 A1 | 9/2011 | Moon et al. |
| 2011/0224564 A1 | 9/2011 | Moon et al. |
| 2012/0029322 A1 | 2/2012 | Wartena et al. |
| 2012/0051005 A1 | 3/2012 | Vanfleteren et al. |
| 2012/0053439 A1 | 3/2012 | Ylostalo et al. |
| 2012/0101357 A1 | 4/2012 | Hoskuldsson et al. |
| 2012/0157789 A1 | 6/2012 | Kangas et al. |
| 2012/0165695 A1 | 6/2012 | Kidmose et al. |
| 2012/0182309 A1 | 7/2012 | Griffin et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0265090 A1 | 10/2012 | Fink et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0080794 A1 | 3/2013 | Hsieh |
| 2013/0127708 A1 | 5/2013 | Jung et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0265229 A1 | 10/2013 | Forutanpour et al. |
| 2013/0265437 A1 | 10/2013 | Thörn et al. |
| 2013/0271292 A1 | 10/2013 | McDermott |
| 2013/0312256 A1 | 11/2013 | Wesselmann et al. |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028539 A1* | 1/2014 | Newham .............. G06F 1/1694 345/156 |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0094675 A1 | 4/2014 | Luna et al. |
| 2014/0121471 A1 | 5/2014 | Walker |
| 2014/0122958 A1 | 5/2014 | Greenebrg et al. |
| 2014/0157168 A1* | 6/2014 | Albouyeh ............. G06F 3/0484 715/770 |
| 2014/0194062 A1 | 7/2014 | Palin et al. |
| 2014/0198034 A1 | 7/2014 | Bailey et al. |
| 2014/0198035 A1 | 7/2014 | Bailey et al. |
| 2014/0236031 A1 | 8/2014 | Banet et al. |
| 2014/0240103 A1 | 8/2014 | Lake et al. |
| 2014/0249397 A1 | 9/2014 | Lake et al. |
| 2014/0257141 A1 | 9/2014 | Giuffrida et al. |
| 2014/0285326 A1 | 9/2014 | Luna et al. |
| 2014/0299362 A1 | 10/2014 | Park et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0349257 A1 | 11/2014 | Connor |
| 2014/0375465 A1 | 11/2014 | Fenuccio et al. |
| 2014/0354528 A1 | 12/2014 | Laughlin et al. |
| 2014/0354529 A1 | 12/2014 | Laughlin et al. |
| 2014/0364703 A1 | 12/2014 | Kim et al. |
| 2015/0011857 A1 | 1/2015 | Henson et al. |
| 2015/0025355 A1 | 1/2015 | Bailey et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0084860 A1 | 3/2015 | Aleem et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0141784 A1 | 5/2015 | Morun et al. |
| 2015/0148641 A1 | 5/2015 | Morun et al. |
| 2015/0160621 A1 | 6/2015 | Yilmaz |
| 2015/0182113 A1 | 7/2015 | Utter, II |
| 2015/0182130 A1 | 7/2015 | Utter, II |
| 2015/0182163 A1 | 7/2015 | Utter |
| 2015/0182164 A1 | 7/2015 | Utter, II |
| 2015/0185838 A1 | 7/2015 | Camacho-Perez et al. |
| 2015/0186609 A1 | 7/2015 | Utter, II |
| 2015/0216475 A1 | 8/2015 | Luna et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0277575 A1 | 10/2015 | Ataee et al. |
| 2015/0296553 A1 | 10/2015 | DiFranco et al. |
| 2015/0325202 A1 | 11/2015 | Lake et al. |
| 2015/0370333 A1 | 12/2015 | Ataee et al. |
| 2016/0020500 A1 | 1/2016 | Matsuda |
| 2016/0150636 A1 | 5/2016 | Otsubo |
| 2016/0156762 A1 | 6/2016 | Bailey et al. |
| 2016/0199699 A1 | 7/2016 | Klassen |
| 2016/0202081 A1 | 7/2016 | Debieuvre et al. |
| 2016/0274758 A1 | 9/2016 | Bailey |
| 2016/0309249 A1 | 10/2016 | Wu et al. |

FOREIGN PATENT DOCUMENTS

| | | |
|---|---|---|
| EP | 0 301 790 A2 | 2/1989 |
| JP | 2009-50679 A | 3/2009 |
| KR | 10-2012-0094870 A | 8/2012 |
| KR | 10-2012-0097997 A | 9/2012 |
| WO | 2011/070554 A2 | 6/2011 |

OTHER PUBLICATIONS

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

Gourmelon et al., "Contactless sensors for Surface Electromyography," Proceedings of the 28th IEEE EMBS Annual International Conference, New York City, NY, Aug. 30-Sep. 3, 2006, pp. 2514-2517.

International Search Report and Written Opinion, dated May 16, 2014, for corresponding International Application No. PCT/US2014/017799, 9 pages.

International Search Report and Written Opinion, dated Aug. 21, 2014, for corresponding International Application No. PCT/US2014/037863, 10 pages.

International Search Report and Written Opinion, dated Nov. 21, 2014, for corresponding International Application No. PCT/US2014/052143, 9 pages.

International Search Report and Written Opinion, dated Feb. 27, 2015, for corresponding International Application No. PCT/US2014/067443, 10 pages.

International Search Report and Written Opinion, dated May 27, 2015, for corresponding International Application No. PCT/US2015/015675, 9 pages.

Morris et al., "Emerging Input Technologies for Always-Available Mobile Interaction," *Foundations and Trends in Human-Computer Interaction* 4(4):245-316, 2010. (74 total pages).

(56) References Cited

OTHER PUBLICATIONS

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE 1st International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the 5th IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Sato et al., "Touche: Enhancing Touch Interaction on Humans, Screens, Liquids, and Everyday Objects," CHI' 12, May 5-10, 2012, Austin, Texas.

Ueno et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007.

Ueno et al., "Feasibility of Capacitive Sensing of Surface Electromyographic Potential through Cloth," *Sensors and Materials* 24(6):335-346, 2012.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Xu et al., "Hand Gesture Recognition and Virtual Game Control Based on 3D Accelerometer and EMG Sensors," Proceedings of the 14th international conference on Intelligent user interfaces, Sanibel Island, Florida, Feb. 8-11, 2009, pp. 401-406.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

Brownlee, "Finite State Machines (FSM): Finite state machines as a control technique in Artificial Intelligence (AI)," Jun. 2002, 12 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

* cited by examiner

SYSTEMS, METHODS, AND COMPUTER PROGRAM PRODUCTS FOR INTERACTING WITH ELECTRONICALLY DISPLAYED PRESENTATION MATERIALS

BACKGROUND

Technical Field

The present systems, methods, and computer program products generally relate to manipulating electronically displayed content and particularly relate to controllably magnifying or "zooming-in on" electronically displayed presentation materials.

Description of the Related Art

ELECTRONICALLY DISPLAYED PRESENTATION MATERIALS

Electronic displays come in many different forms, including without limitation: flat panel displays such as liquid crystal displays ("LCDs") and plasma displays, cathode ray tube displays, projection displays, and so on. The content displayed on an electronic display may include still images, text, animations, and/or video. In a specific application, the content displayed on an electronic display may include materials to supplement a presentation given by one or more orators (i.e., "electronically displayed presentation materials").

A person of skill in the art will be familiar with many different software applications (hereafter "presentation software") that enable a user (e.g., a presenter) to electronically display and navigate through presentation materials. Popular examples of presentation software include Microsoft PowerPoint®, Google Slides®, and Keynote® by Apple Inc. ("PowerPoint et al."), all of which enable the presenter to enhance their presentation through the electronic display of "presentation slides." As the user presents, he/she is able to navigate from one slide to the next while displaying the slides to an audience on one or more electronic display(s). This is a very well-established presentation format, so much so that it is becoming a bit stale. Most presentation software available today only permits the user to interact with slides by navigating forwards and backwards between slides. Recently, new presentation software called Prezi™ has been introduced which abandons the slide concept and instead displays presentation materials in a parallax three-dimensional virtual space. The presenter can navigate the virtual space by, for example, turning, rotating, and/or zooming in/out, all on display for the audience. The enhanced interactivity and navigability introduced by Prezi™ facilitates more dynamic and unconventional presentation styles, allowing presenters to break from the norm established by PowerPoint® et al. and, arguably, giving rise to more interesting presentations. However, PowerPoint® et al. are thoroughly ingrained in personal and business computing environments today and the majority of electronically displayed presentation materials continue to use the "slide" format afforded by these applications. There is a need in the art for enhancements and adaptations to existing presentation software (e.g., PowerPoint® et al.) that introduce new, more dynamic ways of interacting with typical presentation slides.

BRIEF SUMMARY

A method of operation in a display system which comprises at least one processor, an electronic display communicatively coupled to the at least one processor, and at least one non-transitory processor-readable storage medium communicatively coupled to the at least one processor, wherein the at least one non-transitory processor-readable storage medium stores at least one of processor-executable instructions and data, may be summarized as including: causing, by the at least one processor, a display of content at a first magnification level on the electronic display; receiving, by the at least one processor, a user input indicative of a magnification setting command; in response to the user input indicative of the magnification setting command: capturing, by the at least one processor, a digital copy image of the content; digitally magnifying, by the at least one processor, at least a portion of the digital copy image of the content; and causing, by the at least one processor, a display of the digitally magnified at least a portion of the digital copy image of the content at a second magnification level on the electronic display, the second magnification level greater than the first magnification level. The method may further include causing, by the at least one processor, an overlay of a borderless window that is transparent to both content and a majority of events on at least a portion of the display of content on the electronic display, wherein causing, by the at least one processor, a display of the digitally magnified at least a portion of the digital copy image of the content at a second magnification level on the electronic display includes causing, by the at least one processor, a display of the digitally magnified at least a portion of the digital copy image of the content at the second magnification level in the borderless window on the electronic display.

Capturing, by the at least one processor, a digital copy image of the content may include capturing, by the at least one processor, a screenshot of the content. Digitally magnifying, by the at least one processor, at least a portion of the digital copy image of the content may include producing, by the at least one processor, a series of digital copy images of respective portions of the content at successive (e.g., successively greater or successively lesser) magnification levels; and causing, by the at least one processor, a display of the digitally magnified at least a portion of the digital copy image of the content at a second magnification level on the electronic display may include causing, by the at least one processor, a sequential display of the series of digital copy images of respective portions of the content at successive (e.g., successively greater or successively lesser) magnification levels. Causing, by the at least one processor, a display of the digitally magnified at least a portion of the digital copy image of the content on the electronic display at a second magnification level may include causing, by the at least one processor, the digitally magnified at least a portion of the digital copy image of the content to overlay at least a portion of the content on the electronic display.

The method may further include: receiving, by the at least one processor, a user input indicative of a display restoration command; and in response to the user input indicative of the display restoration command: stopping, by the at least one processor, the display of the digitally magnified at least a portion of the digital copy image of the content at a second magnification level on the electronic display. Causing, by the at least one processor, a display of the digitally magnified at least a portion of the digital copy image of the content at a second magnification level on the electronic display may include causing, by the at least one processor, the digitally magnified at least a portion of the digital copy image of the content to completely overlay the content and stopping by the at least one processor, the display of the content at the first magnification level on the electronic display, and the method may further include: in response to the user input indicative of the display restoration command: causing, by the at least one processor, a resumption of the display of the content at the first magnification level on the electronic display. Digitally magnifying, by the at least one processor, at least a portion of the digital copy image of the content may include producing, by the at least one processor, a series of digital copy images of respective portions of the content at successively greater magnification levels; and stopping, by the at least one processor, a display of the digitally magnified at least a portion of the digital copy image of the content at a second magnification level on the electronic display may include causing, by the at least one processor, sequential display of the series of digital copy images of respective portions of the content at successively lesser magnification levels.

The display system may include a portable control device, and the method may further include: detecting, by the portable control device, the user input indicative of the magnification setting command; in response to detecting, by the portable control device, the user input indicative of the magnification command, transmitting a first signal by the portable control device; and receiving the first signal by the at least one processor. The portable control device may include a gesture-based control device and wherein detecting, by the portable control device, the user input indicative of the magnification setting command may include detecting, by the gesture-based control device, a first physical gesture performed by a user of the display system.

The method may further include: receiving, by the at least one processor, a user input indicative of a pointer command; in response to the user input indicative of the pointer command: causing, by the at least one processor, a display of a dynamic cursor over a portion of the content on the electronic display, and wherein: digitally magnifying, by the at least one processor, at least a portion of the digital copy image of the content includes digitally magnifying, by the at least one processor, at least the portion of the content over which the dynamic cursor is displayed. The method may include causing, by the at least one processor, an overlay of a borderless window that is transparent to both content and a majority of events on at least a portion of the display of the content on the electronic display, and causing, by the at least one processor, a display of a dynamic cursor over a portion of the content on the electronic display may include causing, by the at least one processor, a display of the dynamic cursor in the borderless window over top of a portion of the content on the electronic display.

A display system may be summarized as including: an electronic display; at least one processor communicatively coupled to the electronic display; and at least one non-transitory processor-readable storage medium communicatively coupled to the at least one processor, wherein the at least one non-transitory processor-readable storage medium stores at least one of processor-executable instructions and data that, when executed by the at least one processor, cause the display system to: display a content at a first magnification level on the electronic display; and in response to a user input indicative of a magnification setting command: capture a digital copy image of the content; digitally magnify at least a portion of the digital copy image of the content; and display the digitally magnified at least a portion of the digital copy image of the content at a second magnification level on the electronic display, the second magnification level greater than the first magnification level. When executed by the at least one processor, the at least one of processor-executable instructions and data may cause the display system to: overlay a borderless window that is transparent to both content and a majority of events on at least a portion of the display of the content on the electronic display, and display the digitally magnified at least a portion of the digital copy image of the content at the second magnification level in the borderless window on the electronic display. In response to a user input indicative of a magnification setting command, when executed by the at least one processor, the at least one of processor-executable instructions and data may cause the display system to: digitally magnify at least a portion of the digital copy image of the content cause the display system to produce a series of digital copy images of respective portions of the content at successive (e.g., successively greater or successively lesser) magnification levels, and sequentially display the series of digital copy images of respective portions of the content at successive (e.g., successively greater or successively lesser) magnification levels.

In response to a user input indicative of a magnification setting command, when executed by the at least one processor, the at least one of processor-executable instructions and data may cause the display system to display the digitally magnified at least a portion of the digital copy image of the content to overlay at least a portion of the content on the electronic display. When executed by the at least one processor, the at least one of processor-executable instructions and data may cause the display system to: in response to a user input indicative of a display restoration command: stop displaying the digitally magnified at least a portion of the digital copy image of the content at a second magnification level on the electronic display.

The display system may further include: a portable control device responsive to at least the user input indicative of the magnification setting command, wherein in response to the user input indicative of the magnification setting command the portable control device transmits at least one signal to the at least one processor. The portable control device may include a gesture-based control device responsive to at least a first physical gesture performed by a user of the display system.

When executed by the at least one processor, the at least one of processor-executable instructions and data may cause the display system to: in response to a user input indicative of a pointer command: display a dynamic cursor over a portion of the content on the electronic display, and in response to a user input indicative of a magnification setting command: digitally magnify at least the portion of the content over which the dynamic cursor is displayed. When executed by the at least one processor, the at least one of processor-executable instructions and data may cause the display system to: overlay a borderless window that is transparent to both content and a majority of events on at least a portion of the display of the content on the electronic display, and display a dynamic cursor over a portion of the content on the electronic display cause the display system to display the dynamic cursor in the borderless window over top of a portion of the content on the electronic display.

A non-transitory processor-readable storage medium of a digital computer system may be summarized as including: at least one of processor-executable instructions and data that, when executed by at least one processor of the digital computer system, cause the digital computer system to: display a content at a first magnification level on an electronic display; and in response to a user input indicative of a magnification setting command: capture a digital copy image of the content; digitally magnify at least a portion of the digital copy image of the content; and display the digitally magnified at least a portion of the digital copy image of the content at a second magnification level on the electronic display, the second magnification level greater than the first magnification level.

The non-transitory processor-readable storage medium may further include at least one of processor-executable instructions and data that, when executed by the at least one processor of the digital computer system, cause the digital computer system to: overlay a borderless window that is transparent to both content and a majority of events on at least a portion of the display of the content on the electronic display, and wherein the at least one of processor-executable instructions and data that, when executed by the processor of the digital computer system, cause the digital computer system to display the digitally magnified at least a portion of the digital copy image of the content at a second magnification level on the electronic display cause the digital computer system to display the digitally magnified at least a portion of the digital copy image of the content at the second magnification level in the borderless window on the electronic display.

The at least one of processor-executable instructions and data that, when executed by the at least one processor of the digital computer system, cause the digital computer system to, in response to a user input indicative of a magnification setting command, digitally magnify at least a portion of the digital copy image of the content may cause the digital computer system to produce a series of digital copy images of respective portions of the content at successive (e.g., successively greater or successively lesser) magnification levels, and the at least one of processor-executable instructions and data that, when executed by the at least one processor of the digital computer system, cause the digital computer system to, in response to a user input indicative of a magnification setting command, display the digitally magnified at least a portion of the digital copy image of the content at a second magnification level on the electronic display may cause the digital computer system to sequentially display the series of digital copy images of respective portions of the content at successive (e.g., successively greater or successively lesser) magnification levels on the electronic display.

The at least one of processor-executable instructions and data that, when executed by the at least one processor of the digital computer system, cause the digital computer system to, in response to a user input indicative of a magnification setting command, display the digitally magnified at least a portion of the digital copy image of the content at a second magnification level on the electronic display may cause the digitally magnified at least a portion of the digital copy image of the content to overlay at least a portion of the content on the electronic display.

The non-transitory processor-readable storage medium may further include at least one of processor-executable instructions and data that, when executed by the at least one processor of the digital computer system, cause the digital computer system to, in response to a user input indicative of a display restoration command: stop displaying the digitally magnified at least a portion of the digital copy image of the content at the second magnification level on the electronic display.

The non-transitory processor-readable storage medium may further include at least one of processor-executable instructions and data that, when executed by the at least one processor of the digital computer system, cause the digital computer system to, in response to a user input indicative of a pointer command: display a dynamic cursor over a portion of the content on the electronic display, and wherein the at least one of processor-executable instructions and data that, when executed by the processor of the digital computer system, cause the digital computer system to, in response to a user input indicative of a magnification setting command, digitally magnify at least a portion of the digital copy image of the content cause the display system to digitally magnify at least the portion of the content over which the dynamic cursor is displayed.

The non-transitory processor-readable storage medium may further include at least one of processor-executable instructions and data that, when executed by the at least one processor of the digital computer system, cause the digital computer system to: overlay a borderless window that is transparent to both content and a majority of events on at least a portion of the display of the content on the electronic display, and wherein the at least one of processor-executable instructions and data that, when executed by the processor of the digital computer system, cause the digital computer system to display a dynamic cursor over a portion of the content on the electronic display cause the digital computer system to display the dynamic cursor in the borderless window over top of a portion of the content on the electronic display.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, methods, and computer program products to enable new user interactions with electronically displayed presentation materials. In particular, the present systems, methods, and computer program products introduce a magnification, or "zoom," capability to presentation software that does not otherwise include such functionality.

Figure 1:
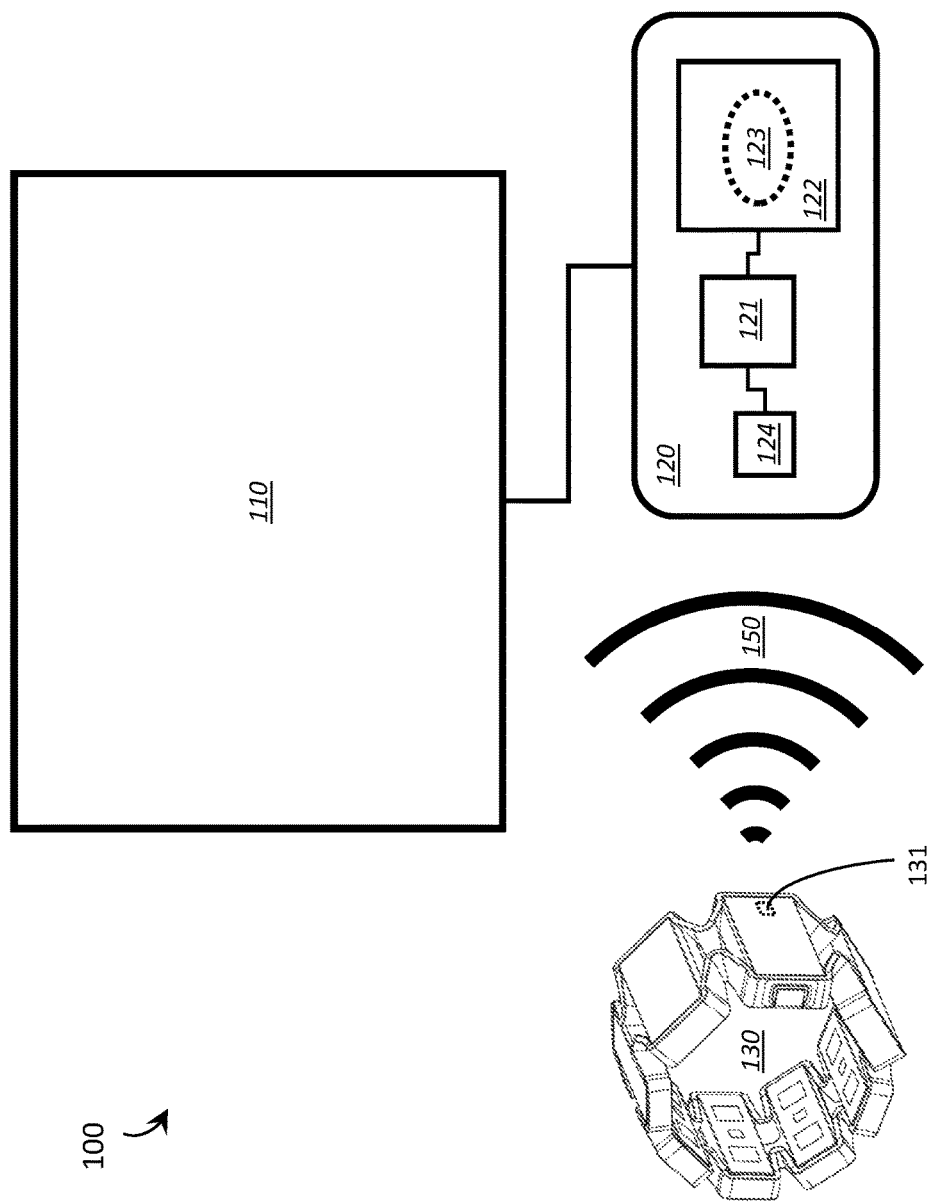
FIG. 1 is an illustrative diagram showing an exemplary display system in accordance with the present systems, methods, and computer program products.

FIG. 1 is an illustrative diagram showing an exemplary display system 100 in accordance with the present systems, methods, and computer program products. Display system 100 includes an electronic display 110 that may employ any form of electronic display technology (at any scale). Display 110 is communicatively coupled to a digital control system 120 that comprises, at least, a digital processor 121 and a non-transitory processor-readable storage medium or memory 122 communicatively coupled to processor 121. In alternative implementations, a display system (and/or a digital control system component thereof) may include multiple digital processors and/or multiple non-transitory processor-readable storage media or memories, but for the sake of simplicity a single digital processor 121 coupled to a single memory 122 is used for descriptive purposes in this specification. Memory 122 stores at least one of processor-executable instructions and data (collectively 123) that, when executed by processor 121, cause processor 121 to determine and control content displayed on electronic display 110. In the illustrated example, processor 121 is also communicatively coupled to a wireless receiver 124 (e.g., a wireless transceiver with at least wireless receiving functionality) to receive one or more signal(s) embodying one or more user input(s) indicative of one or more command(s) to navigate or otherwise interact with content displayed on electronic display 110. To this end, display system 100 also includes a portable control device 130 responsive to user inputs. Portable control device 130 includes a wireless transmitter 131 (e.g., a wireless transceiver with at least wireless transmitting functionality) that, in response to one or more user input(s) effected by a user, transmits one or more wireless control signal(s) 150 to be received by wireless receiver 124 and processed by processor 121 in accordance with instructions or data 123 in order to effect one or more control(s) of or interaction(s) with content displayed on electronic display 110. Depending on the specific implementation, wireless transmitter 131 may include, for example, a radio frequency transmitter and/or an infrared frequency (i.e., optical) transmitter, and the wireless signal(s) 150 transmitted by wireless transmitter 131 may include, for example, radio frequency signal(s) and/or infrared frequency (i.e., optical) signal(s).

A person of skill in the art will appreciate that portable control device 130 may be any of a wide-variety of control devices, including without limitation: a remote control, a presentation clicker, a presentation remote, or a wireless remote presenter, or the like. In alternative implementations, portable control device 130 may not be a wireless device and may instead be communicatively coupled through a wired connection to a tethered connector port (e.g., a Universal Serial Bus port) component of digital control system 120. In the illustrated embodiment, device 130 is a wearable gesture-based control device responsive to physical gestures performed by a user of display system 100. An example of a suitable gesture-based control device is the Myo™ armband available from Thalmic Labs Inc., and accordingly, the present systems, methods, and computer program products may incorporate or be adapted to work with the teachings in any or all of: US Patent Publication US 2014-0240103 A1, US Patent Publication US 2015-0057770 A1, US Patent Publication US 2015-0070270 A1, U.S. Non-Provisional patent application Ser. No. 14/658,552 (now US Patent Publication US 2015-0261306 A1), and/or U.S. Non-Provisional patent application Ser. No. 14/679,850 (now US Patent Publication US 2015-0296553 A1), each of which is incorporated herein by reference in its entirety.

The combination of electronic display 110 and digital control system 120 is hereinafter referred to as a "digital computer system." For clarity, a digital computer system may include far more components than those illustrated in FIG. 1, and may include, for example, multiple electronic displays 110. In the illustrated embodiment, electronic display 110 may comprise a computer monitor such as a laptop monitor or desktop computer screen. Advantageously for the present systems, methods, and computer program products, electronic display 110 may comprise a presentation monitor suitable for use in electronically displaying presentation materials to one or more audience member(s). Exemplary suitable presentation monitors include, without limitation, one or more large screen flat panel display(s), one or more large screen projection display(s), or similar.

The various embodiments described herein include, make use of, or generally relate to one or more computer program product(s) directly loadable into a non-transitory processor-readable storage medium of a digital computer system. Such a computer program product stores at least one of processor-executable instructions and data that, when executed by the processor of the digital computer system, cause the digital computer system to perform one or more action(s). For example, memory 122 in FIG. 1 has, loaded therein, a computer program product 123 that comprises processor-executable instructions and/or data which, when executed by processor 121, cause display system 100 to implement a method of operating a display system in accordance with the present systems, methods and computer program products. A method of operating display system 100 may include a method of effecting controls of and/or interactions with content (e.g., presentation materials) electronically displayed on electronic display 110.

Figure 2:
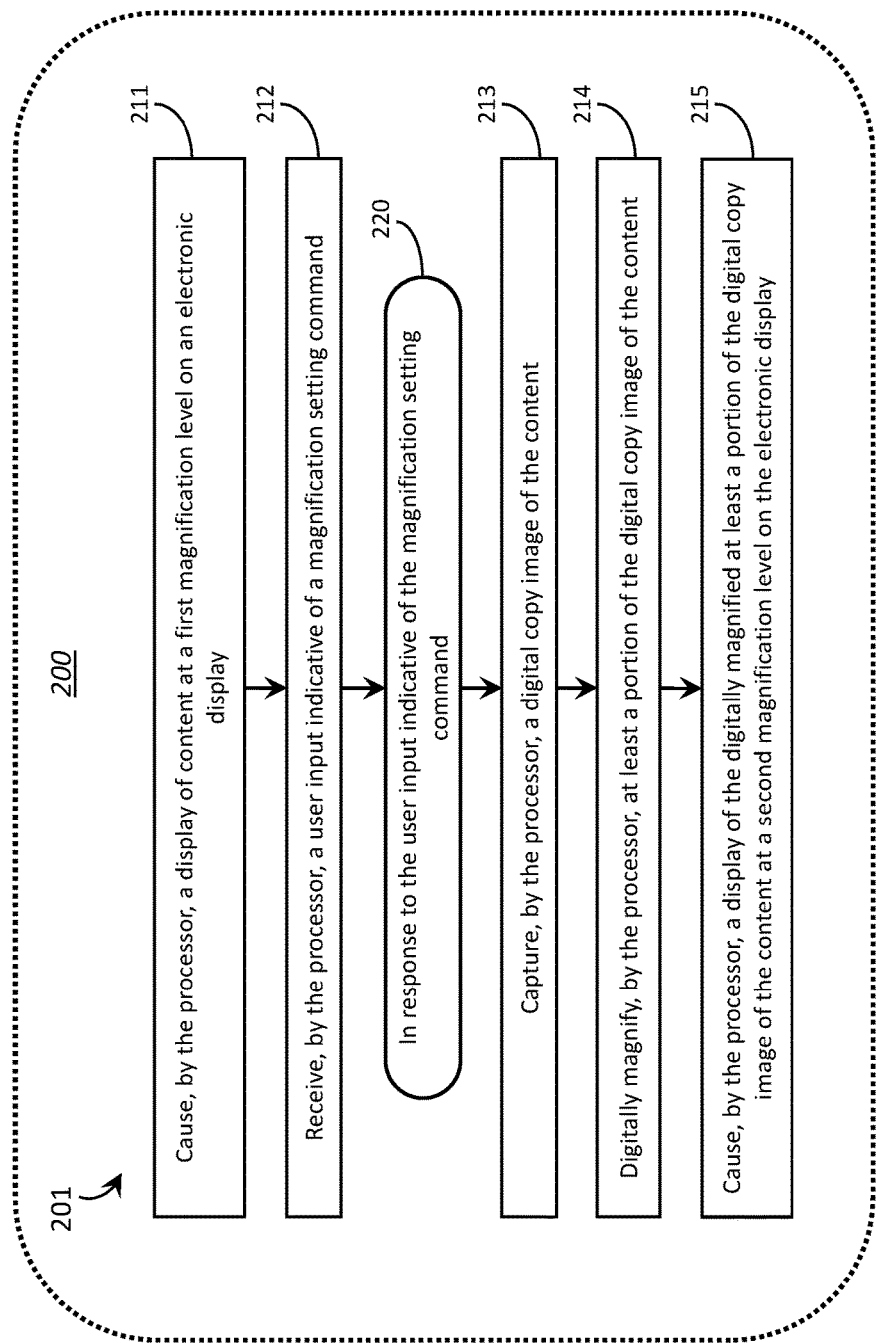
FIG. 2 is an illustrative diagram of a computer program product directly loadable into a non-transitory processor-readable storage medium of a digital computer system, where the computer program product includes processor-executable instructions and/or data that, when executed by the processor of the digital computer system, cause the digital computer system to implement a method in accordance with the present systems, methods, and computer program products.

FIG. 2 is an illustrative diagram of a computer program product 200 (drawn with a dashed line in FIG. 2) directly loadable into a non-transitory processor-readable storage medium of a digital computer system, where the computer program product 200 includes processor-executable instructions and/or data that, when executed by the processor of the digital computer system, cause the digital computer system to implement a method 201. In order to illustrate the processor-executable instructions and/or data "carried within" computer program product 200, FIG. 2 depicts a flow-diagram within computer program product 200 showing the acts of an exemplary method 201 of operating a display system. It is to be understood that the flow-diagram in FIG. 2 represents an effect, result, or outcome of loading computer program product 200 into a non-transitory processor-readable storage medium of a digital computer system and executing the processor-executable instructions and/or data included in computer program product 200 by the processor of the digital computer system. It is also noted that specific instructions of the computer program product may vary from that shown dependent on the particular programming language and target processor that will execute the instructions.

Method 201 includes five acts 211, 212, 213, 214, and 215 (depicted by rectangular boxes in FIG. 2) and one criterion 220 (depicted by a rounded box in FIG. 2), where acts 213, 214, and 215 are only performed when criterion 220 is satisfied. FIG. 2 depicts an implementation of method 201 for which criterion 220 is satisfied. Those of skill in the art will appreciate that in alternative embodiments certain acts/criteria may be omitted and/or additional acts/criteria may be added. Those of skill in the art will also appreciate that the illustrated order of the acts/criteria is shown for exemplary purposes only and may change in alternative embodiments.

At 211, the processor of the digital computer system causes a display of content at a first magnification level on an electronic display of the digital computer system. If the digital computer system includes (or is communicatively coupled to) multiple electronic displays of which at least one is a presentation monitor, then at 211 the processor advantageously causes a display of content at a first magnification level on at least one presentation monitor.

Throughout this specification and the appended claims, reference is often made to "content," as in, for example, "display of content" at act 211. Unless the specific context requires otherwise, the term "content" is used in such instances to encompass any type of visual content, on its own or in any combination with other types of visual content. Examples of visual content include, without limitation: a computer's desktop, one or more software application window(s), content displayed in one or more software application window(s), one or more still image(s), one or more video(s), one or more animation(s), and any combination thereof. Thus, at 211 the processor causes a display of content on the electronic display by causing any of the above-listed examples (including any combination thereof) to display on the electronic display, either at full screen resolution or in windowed form.

At 212, the processor of the digital computer system receives a user input indicative of a magnification setting command. Throughout this specification and the appended claims, receipt, by a processor, of a user input indicative of a magnification setting command encompasses receipt, by the processor, of one or more signal(s) representative of the user input indicative of the magnification setting command (such as, for example, receipt by the processor of one or more signal(s) transmitted by a portable control device in response to a user input indicative of a magnification setting command detected by the portable control device). In implementations in which the digital computer system is itself a part of a larger display system that further comprises a portable control device (e.g., device 130 of display system 100), the portable control device may detect the user input indicative of the magnification setting command and, in response to detecting the user input indicative of the magnification setting command, transmit a first signal. Exemplary portable control device 130 in FIG. 1 is a gesture-based control device that detects user inputs in the form of specific recognizable physical gestures performed by the user. Thus, for exemplary system 100, gesture-based control device 130 may detect a first physical gesture performed by the user as the user input indicative of the magnification setting command. Gesture-based control device 130 may then transmit a first signal in response to detecting the first physical gesture, where the first physical gesture corresponds to a specific physical gesture recognizable by the system 100 as a gesture and identifiable by the system 100 as corresponding to a particular command.

At 220, a criterion is specified and this criterion must be met before method 201 proceeds to act 213. The criterion is that the processor must receive the user input indicative of a magnification setting command per act 212. Method 201 only proceeds to acts 213, 214, and 215 in response to the processor receiving a user input indicative of a magnification setting command. In some implementations, the processor-executable instructions and/or data may cause the processor to operate as a state machine where, in response to a user input (such as the user input indicative of a magnification setting command), the processor transitions from a first operational mode/state into a second operational mode/state. In this case, the state of the processor prior to criterion 220 being satisfied is a first operational state in which the processor performs act 211 of method 201 and the state of the processor after criterion 220 is satisfied (as triggered by act 212) is a second operational state in which the processor performs acts 213, 214, and 215 of method 201.

As previously described, FIG. 2 depicts an implementation of method 201 in which criterion 220 is satisfied; thus, in the illustrated example of method 201 the processor implicitly receives the first signal transmitted by the portable control device (i.e., in implementations that employ a portable control device). Method 201 then proceeds to act 213.

At 213, the processor of the digital computer system captures a digital copy image of the content that the processor caused to be displayed on the electronic display at 211. For example, the processor may capture or cause to be captured a screenshot or frame of the content being displayed on the electronic display. A digital copy image may generally take the form of a still image. If the content at 211 involves dynamic elements such as video or animation, the digital copy image may represent a single instance in time of such dynamic elements. Throughout this specification and the appended claims, to "capture a digital copy image of content" generally means to produce, or reproduce, a second version of content based on a first version of the content. This may be implemented in a variety of different ways, including without limitation: producing a copy of some or all of the data corresponding to the content that is stored in the memory of the system and writing that copy to the memory of the system and/or performing, by the processor of the system, a second execution of the all or a portion of the same processor-executable instructions that caused the processor to create the content in the first place and writing a result of the second execution of the processor-executable instructions to the memory of the system. In the former example, data that corresponds to the content may be stored as one or more file(s) in the memory of the system and capturing a digital image copy of the content may include copying all or portion(s) of the one or more file(s). In the latter example, processor-executable instructions that, when executed by the processor of the system a first time, cause the processor to create the content may be executed a second time to cause the processor to "re-create" all or a portion of the content as a digital copy image of the content. In either case, the content and the digital copy image of the content may respectively correspond to different data stored in one or more memory(ies) of the system.

At 214, the processor of the digital computer system digitally magnifies at least a portion of the digital copy image of the content that was captured at 213. Digitally magnifying at least a portion of the digital copy image of the content may include generating, by the processor, a second copy image of the content at a second magnification level, the second magnification level greater than the first magnification level.

At 215, the processor of the digital computer system causes a display of the digitally magnified at least a portion of the digital copy image of the content at a second magnification level on the electronic display of the digital computer system. The second magnification level may be greater than the first magnification level. The digitally magnified at least a portion of the digital copy image of the content may replace, substitute for, or overlay at least a portion of the content displayed on the electronic display at 211. Display of the digitally magnified at least a portion of the digital copy image of the content at the second magnification level may be presented as a single large discrete jump in magnification from the first magnification level to the second magnification level. Alternatively, display of the digitally magnified at least a portion of the digital copy image may be presented as a dynamic zoom (i.e., "zoom-in") from the first magnification level to the second magnification level and thereby depict sequentially increasing levels of magnification in between the first magnification level and the second magnification level. In this dynamic zoom implementation, the processor may digitally magnify the at least a portion of the digital copy image of the content at 214 by, for example, producing or generating a series of digital copy images of respective portions of the content at successive (i.e., successively greater) magnification levels, and the processor may cause a display of the digitally magnified at least a portion of the digital copy image of the content at 215 by, for example, causing a sequential display of the series of digital copy images of respective portions of the content at successive (i.e., successively greater) magnification levels.

Because the display of the digitally magnified at least a portion of the digital copy image is a still image that replaces, substitutes for, or overlays at least a portion of the original content displayed on the electronic display at 211, it may be desirable to remove the digitally magnified at least a portion of the digital copy image from the electronic display after a period of time. For example, if the content that the processor causes to be displayed at 211 is one of many presentation slides, and the user/presenter magnifies or "zooms in on" at least a portion of that slide through acts 213, 214, and 215, then the user/presenter may wish to "unmagnify" or "zoom out of" the at least a portion of that slide as the presentation progresses (e.g., to move on to the next slide). Accordingly, method 201 may go on to include further acts not illustrated in FIG. 2. As an example, the processor of the digital computer system may receive a user input indicative of a display restoration command. If the user/presenter is using a portable control device such as a wearable gesture-based control device, the user/presenter may invoke the display restoration command using one or more control(s) of the portable control device, such as a second physical gesture if the portable control device is a gesture-based control device. In response to the user input indicative of the display restoration command, the processor of the digital computer system stops (i.e., causes to stop) the display of the digitally magnified at least a portion of the digital copy image of the content on the electronic display. Throughout this specification and the appended claims, receipt, by a processor, of a user input indicative of a display restoration command encompasses receipt, by the processor, of one or more signal(s) representative of the user input indicative of the display restoration command (such as, for example, receipt by the processor of one or more signal(s) transmitted by a portable control device in response to a user input indicative of a display restoration command detected by the portable control device).

Depending on whether or not the display of the digitally magnified at least a portion of the digital copy image of the content fully overlays (e.g., at full screen) the content, some or all of the content may continue to be displayed on the electronic display while the digitally magnified at least a portion of the digital copy image of the content is being displayed. In applications in which the digitally magnified at least a portion of the digital copy image of the content is displayed at full screen resolution on the electronic display (i.e., the digitally magnified at least a portion of the content completely overlays the content), when the processor causes the display of the digitally magnified at least a portion of the digital copy image of the content at 215 the processor may stop (i.e., cause to stop) the display of the content from 211. In this situation, when the processor responds to a user input indicative of a display restoration command and stops (i.e., causes to stop) the display of the digitally magnified at least a portion of the digital copy image of the content, the processor may also, in response to the user input indicative of the display restoration command, cause a resumption of the display of the content at the first magnification level on the electronic display. In other words, act 211 of method 201 may be repeated.

In a similar way to how some implementations may present the display of the digitally magnified at least a portion of the digital copy image at 215 as a dynamic "zoom-in," some implementations may display the stopping (i.e., the causing to stop) of the display of the digitally magnified at least a portion of the digital copy image as a dynamic "zoom out." As previously described, the processor may digitally magnify the at least a portion of the digital copy image of the content at 214 by, for example, producing or generating a series of digital copy images of respective portions of the content at successively greater magnification levels. With access to this series of digital copy images of the content, the processor may stop (i.e., cause to stop) the display of the digitally magnified at least a portion of the digital copy image of the content by, for example, causing a sequential display of the series of digital copy images of respective portions of the content at successively lesser magnification levels.

Method 201, being a representation of the effect of a processor executing processor-executable instructions and/or data stored in computer program product 200, may be implemented in a variety of different ways. An exemplary implementation of method 201 that makes use of a transparent application window and a user-controlled pointer is provided in FIG. 3.

Figure 3:
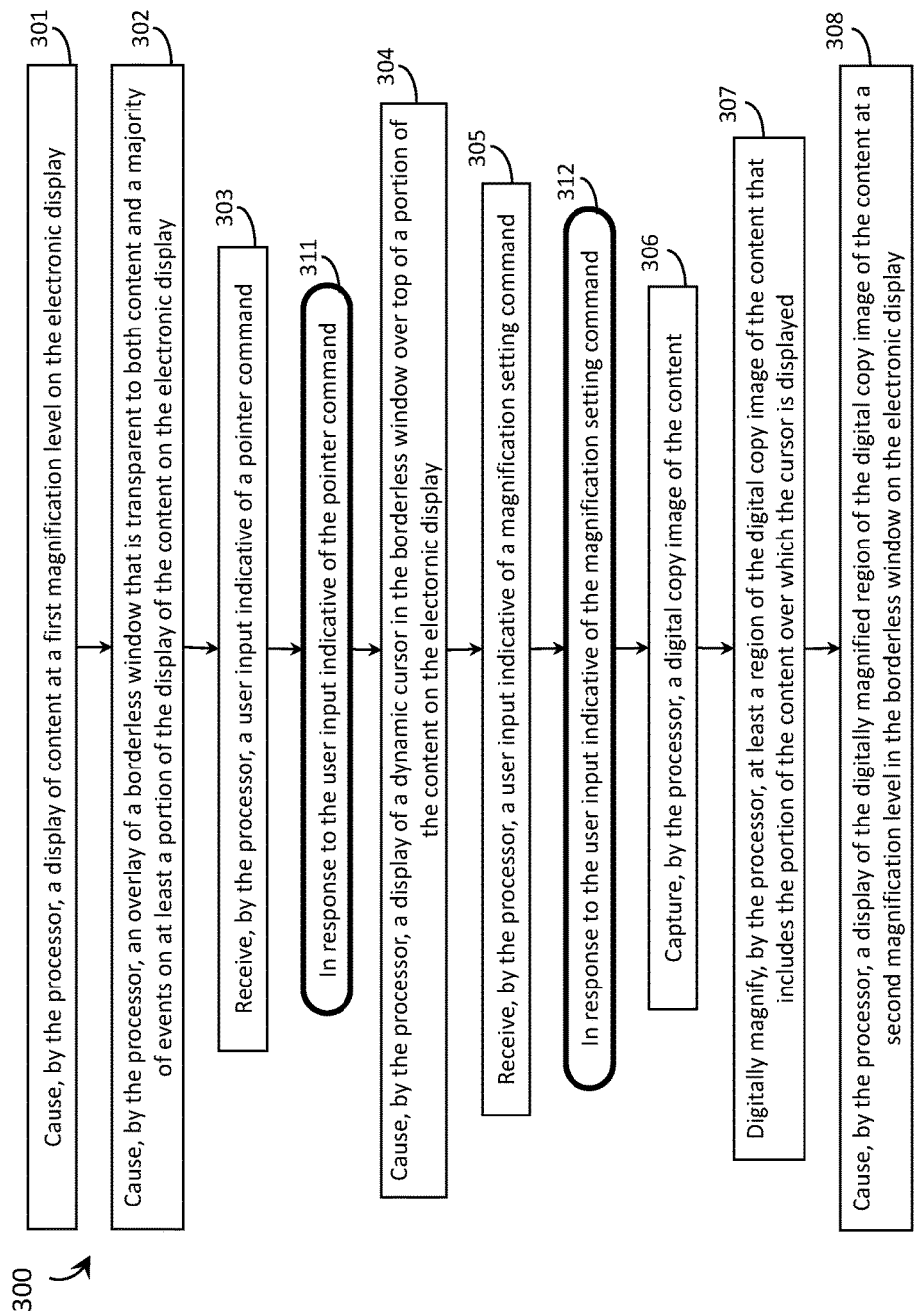
FIG. 3 is a flow-diagram of a method of operation in a display system in accordance with the present systems, methods, and computer program products.

FIG. 3 is a flow-diagram of a method 300 of operation in a display system in accordance with the present systems, methods, and computer program products. The display system may be substantially similar to display system 100 from FIG. 1 and comprise a processor 121, an electronic display 110 communicatively coupled to the processor 121, and a non-transitory processor-readable storage medium or memory 122 communicatively coupled to the processor 121. Method 300 is similar to method 201 from FIG. 2 and includes many similar acts, but method 300 is extended to include further exemplary implementation details to which method 201 is not limited. Like method 201, method 300 may be stored in the form of processor-executable instructions and/or data 123 in a computer program product (e.g., 200) and executable by the processor 121 of a digital computer system 100 if the computer program product is loaded into the non-transitory processor-readable storage medium or memory 122 of the digital computer system 100.

Method 300 includes eight acts 301, 302, 303, 304, 305, 306, 307, and 308 (depicted by rectangular boxes in FIG. 3) and two conditions or criteria 311 and 312 (depicted by rounded boxes in FIG. 3), where acts 304 and 305 are only performed when criterion 311 is satisfied and acts 306, 307, and 308 are only performed when both criterion 311 and criterion 312 are satisfied. FIG. 3 depicts an implementation of method 300 for which criteria 311 and 312 are both satisfied. Those of skill in the art will appreciate that in alternative embodiments certain acts/criteria may be omitted and/or additional acts/criteria may be added. Those of skill in the art will also appreciate that the illustrated order of the acts/criteria is shown for exemplary purposes only and may change in alternative embodiments.

At 301, the processor 121 causes a display of content at a first magnification level on the electronic display 110. Act 301 of method 300 is substantially similar to act 211 of method 201

At 302, the processor 121 causes an overlay of a borderless application window on at least a portion of the content on the electronic display 110. In this context, the term "borderless" means that the window does not have a visible edge or border, though the borderless window may still have a perimeter. The borderless window is in the foreground of electronic display 110, but the borderless window is transparent to content. "Transparent to content" means the borderless window does not obstruct or occlude the content displayed on the electronic display 110 at 301. In other words, the content displayed on the electronic display 110 at 301 projects through the borderless window without being affected. The borderless window is also transparent to a majority of events, meaning that a majority of user-effected or invoked events like keystrokes and mouse clicks "pass through" the borderless window to select or interact with the display content underneath, despite the borderless window being in the foreground. In a conventional digital computing environment, when multiple applications are open simultaneously only the window that is in the foreground is responsive to events (i.e., keystrokes, mouse clicks, etc.); conversely, the borderless window overlaid at 302 is transparent to a majority of events and it is the first window behind the borderless window that contains content (e.g., user selectable icons, fillable fields, user selectable images or text) that will respond to most events. A person of skill in the art will be familiar with the various parameters and flags that may be set when an application window is defined, including those which control background properties (colorless and transparent in this case) and responsiveness to events.

At 303, the processor 121 receives a user input indicative of a pointer command. The user input that is indicative of the pointer command may be effected or invoked by the user using, for example, a portable control device 130 communicatively coupled (e.g., via a wireless connection) to the processor 121. If the portable control device 130 is a gesture-based control device, then the user input indicative of the pointer command may correspond to a particular physical gesture performed by the user. The pointer command is one of the few select events to which the borderless window is responsive. Throughout this specification and the appended claims, receipt, by a processor, of a user input indicative of a pointer command encompasses receipt, by the processor, of one or more signal(s) representative of the user input indicative of the pointer command (such as, for example, receipt by the processor of one or more signal(s) transmitted by a portable control device in response to a user input indicative of a pointer command detected by the portable control device).

At 311, a criterion is specified and this criterion must be met before method 300 proceeds to act 304. The criterion is that the processor 121 must receive the user input indicative of the pointer command per act 303. Method 300 only proceeds to acts 304, 305, 306, 307, and 308 in response to, at least, the processor 121 receiving a user input indicative of a pointer command. As previously described, FIG. 3 depicts an implementation of method 300 in which criterion 311 is satisfied; thus, in method 300 the processor 121 implicitly receives a signal that embodies or otherwise represents a user input indicative of a pointer command. Method 300 then proceeds to act 304.

At 304, the processor 121 causes a display of a dynamic cursor in the borderless window over top of a portion of the content on the electronic display 110 (i.e., over top of a portion of the content from act 301). The cursor may be opaque or partially transparent. The cursor is "dynamic" because, once its display has been triggered per act 304, the position of the cursor on the electronic display 110 (i.e., the position of the cursor in the borderless window and the portion of the content which the cursor overlies) is controllable and dynamically variable by the user. Once the dynamic cursor is displayed at 304, the user may controllably move the cursor around on the electronic display 110 to effectively point to specific regions of the content displayed thereon.

At 305, the processor 121 receives a user input indicative of a magnification setting command. Act 302 of method 300 is substantially similar to act 212 of method 201, with the added detail that, at 305 of method 300, the processor 121 receives the user input indicative of the magnification setting command while the cursor from act 304 is overlying a particular portion of the content on the electronic display

110. The magnification setting command is another one of the few select events to which the borderless window is responsive.

At 312, a criterion is specified and this criterion must be met before method 300 proceeds to act 306. The criterion is that the processor 121 must receive the user input indicative of the magnification setting command per act 305. Method 300 only proceeds to acts 306, 307, and 308 in response to both the processor 121 receiving a user input indicative of a pointer command at 303 and the processor 121 receiving a user input indicative of a magnification setting command at 305. As previously described, FIG. 3 depicts an implementation of method 300 in which criteria 311 and 312 are both satisfied; thus, in method 300 the processor 121 implicitly receives a signal that embodies or otherwise represents a user input indicative of a magnification setting command. Method 300 then proceeds to act 306.

At 306, the processor 121 captures a digital copy image of the content displayed on the electronic display 110 at 301. Act 306 of method 300 is substantially similar to act 213 of method 201. The digital copy image may or may not include the cursor from act 304.

At 307, the processor 121 digitally magnifies at least a region of the digital copy image of the content that includes the portion of the content over which the cursor was displayed when the processor 121 received the user input indicative of the magnification setting command at 305. Act 307 of method 300 is substantially similar to act 214 of method 201, with the added detail that, at 307 of method 300, the processor 121 digitally magnifies specifically a region of the digital copy image that includes the portion of the content displayed on the electronic display 121 over which the cursor is displayed in the borderless window. This feature enables the user to specifically select which region of the digital copy image to digitally magnify. For example, in acts 303 and 304, an input from the user triggers the processor 121 to cause a cursor to display over top of the content on the electronic display. The cursor is dynamic, and further input(s) from the user may trigger the processor 121 to cause the position of the cursor to change. When the position of the cursor aligns with (e.g., overlies, or is proximate to) a region of the content displayed on the electronic display 110 that the user wishes to magnify (i.e., to display at a greater magnification), the user triggers the processor 121 to execute acts 306, 307, and 308.

At 308, the processor 121 causes a display of the digitally magnified region of the digital copy image of the content at a second magnification level in the borderless window on the electronic display 110. Act 308 of method 300 is substantially similar to act 215 of method 201, with the added detail that, at 308 of method 300, the digitally magnified region of the digital copy image specifically includes a portion of the content from act 301 that is proximate, overlaid by, or generally in the region/vicinity of the cursor displayed (and, optionally, controllably displaced on the display by the user) at 304.

As previously described, the present systems, methods, and computer program products may be used in conjunction with a wide variety of electronic display technologies and with virtually any form of content displayed thereon. However, the present systems, methods, and computer program products are particularly well-suited for use in applications when the content being displayed includes presentation materials (e.g., one or more presentation slides) displayed to an audience on one or more presentation monitor(s). In particular, the various embodiments described herein may be used in conjunction with conventional presentation software (e.g., PowerPoint® et al.) to add either or both of the pointer functionality and/or the magnification/zoom functionality to a presentation involving such software. FIGS. 4A through 4F provide an illustrative example of a presentation employing aspects of the present systems, methods, and computer program products.

Figure 4A:
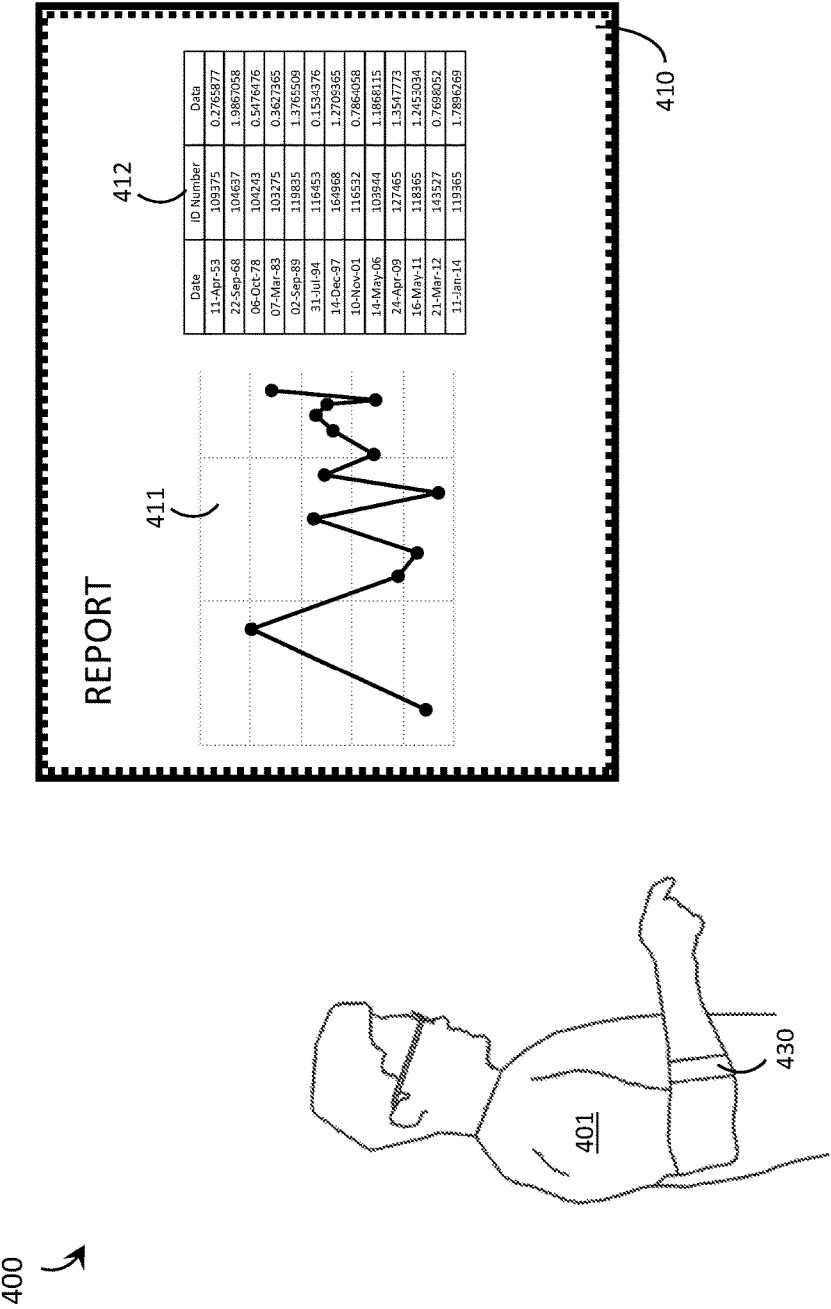
FIG. 4A is an illustrative diagram showing a first stage of an exemplary lecture or presentation in which otherwise conventional presentation materials are enhanced in accordance with the present systems, methods, and computer program products.

FIG. 4A is an illustrative diagram showing a first stage of an exemplary lecture or presentation 400 in which otherwise conventional presentation materials are enhanced in accordance with the present systems, methods, and computer program products. In the exemplary application, a user (e.g., a lecturer, orator, or presenter) 401 is giving a presentation which is supplemented by presentation materials (i.e., "content") displayed on an electronic display 410. Electronic display 410 is part of a display system such as display system 100 from FIG. 1, but other components of the display system (e.g., the digital control system 120 component) are not shown in FIG. 4A to reduce clutter. The user 401 is wearing a gesture-based control device 430 (e.g., a Myo™ armband from Thalmic Labs Inc.) that is wirelessly communicatively coupled to the display system to enable the user 401 to interact with or otherwise control content displayed on electronic display 410. The presentation materials displayed on electronic display 410 in FIG. 4A include a graph element 411 and a data table 412 providing the numerical values that correspond to the graph element. While the graph element 411 is fairly clear and discernible, the numerical data in the corresponding table 412 are difficult to see. Audience members that are particularly far away from electronic display 410 and/or who have trouble focusing on detailed images may not be able to read the numbers presented in table 412. For the purposes of the present systems, methods, and computer program products, table 412 is displayed on electronic display 410 at a first magnification level in FIG. 4A. Thus, FIG. 4A depicts an example of an implementation of act 211 from method 201 and/or act 301 from method 300, in which the processor of a display system causes a display of content (e.g., graph 411 and table 412) at a first magnification level on an electronic display 410.

In FIG. 4A, two different rectangles delineate the edge or perimeter of electronic display 410: a solid black rectangle and a dashed rectangle. The solid black rectangle represents the physical edge or perimeter of electronic display 410. All of the content displayed on electronic display 410 is physically constrained to lie within the solid black rectangle. The dashed rectangle represents the edge or perimeter of a borderless window that overlies the content displayed on electronic display 410, as described in relation to act 302 of method 300. The borderless window is transparent to content displayed on electronic display 410 and shown in a dashed rectangle to represent that even the edge/perimeter of the borderless window is not actually visible on electronic display 410. In exemplary presentation 400, the borderless window is "displayed" at full screen on electronic display 410 and overlies all of the content displayed on electronic display 410, though in alternative embodiments the borderless window may overlie only a portion of electronic display 410. Thus, FIG. 4A also depicts an example of an implementation of act 302 from method 300, in which the processor of the display system causes an overlay of a borderless window that is transparent to both content and a majority of events on at least a portion of the display of the content on the electronic display.

Figure 4B:
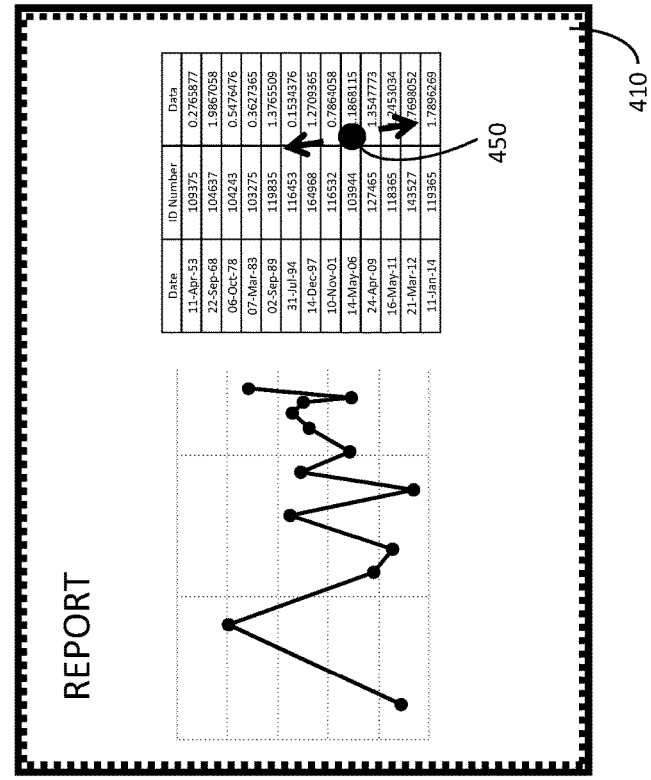
FIG. 4B is an illustrative diagram showing a second stage of the exemplary lecture or presentation from FIG. 4A.
Figure 4B:
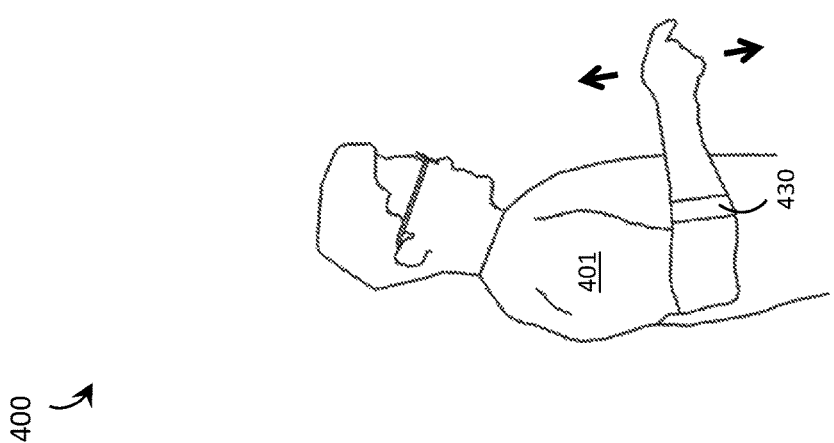

FIG. 4B is an illustrative diagram showing a second stage of the exemplary lecture or presentation 400 from FIG. 4A. In the illustration of FIG. 4B, the user 401 has performed a physical gesture recognized by gesture-based control device 430 as a pointer command. The processor of the display system receives the user input indicative of the pointer command (per act 303 of method 300) and, in response thereto (per criterion 311 of method 300), causes a display of a dynamic cursor 450 in the borderless window over top of a portion of the content on the electronic display 410 (per act 304 of method 300). Dynamic cursor 450 is shown as an opaque circle in FIG. 4B, though a person of skill in the art will appreciate that in alternative implementations dynamic cursor 450 may employ any shape and any level of opacity/transparency.

With dynamic cursor 450 displayed in the borderless window over top of the content on electronic display 410, user 401 is able to control the position of dynamic cursor 450 (much like controlling the position of a typical mouse-controlled cursor) via gesture-based control device 430. The solid arrows adjacent to the hand of user 401 in FIG. 4B, and matching solid arrows adjacent cursor 450, represent that gesture-based control device 430 enables the user to move cursor 450 in the borderless window over top of the content on electronic display 410 by moving his/her hand in the air. In this way, user 401 controllably positions cursor 450 over a region of the content displayed on electronic display 410 which user 401 wishes to display at a second magnification level, the second magnification level greater than the first magnification level. In exemplary presentation 400, user 401 wishes to magnify a particular portion of the data in data table 412 because, as previously described, the data in data table 412 are not easy to discern at the first magnification level.

At this stage in exemplary presentation 400, user 401 performs a physical gesture (e.g., a first or a finger spread gesture) that gesture-based control device 430 interprets as a user input indicative of a magnification setting command. In this example, the user input indicative of a magnification setting command involves a rotation of the user's arm. In response to the arm rotation (e.g., during a first gesture), gesture-based control device 430 wirelessly transmits a signal that is received (per act 305 of method 300) by the processor of the display system and, in response to the signal (per criterion 312 of method 300), the display system executes acts 306, 307, and 308 of method 300. Exemplary presentation 400 illustrates an application of the present systems, methods, and computer program products in which the transition from the first magnification level to the second magnification level is displayed as a multi-stage dynamic zoom. In other words, in presentation 400 user 401 triggers, via gesture-based control device 430, a dynamic zoom-in on the portion/region of the content displayed on electronic display 410 over which cursor 450 is positioned in FIG. 4B. Accordingly, FIGS. 4C, 4D, 4E, and 4F show a sequential display on electronic display 410 of a series of digital copy images of respective portions of the content from FIG. 4A (i.e., successively smaller regions of the data in data table 412) at successively greater magnification levels.

Figure 4C:
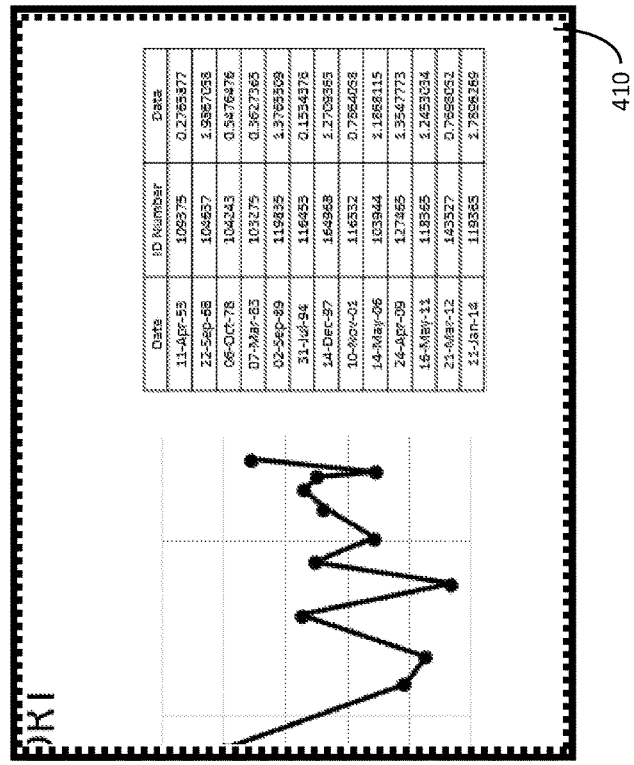
FIG. 4C is an illustrative diagram showing a third stage of the exemplary lecture or presentation from FIGS. 4A and 4B.
Figure 4C:
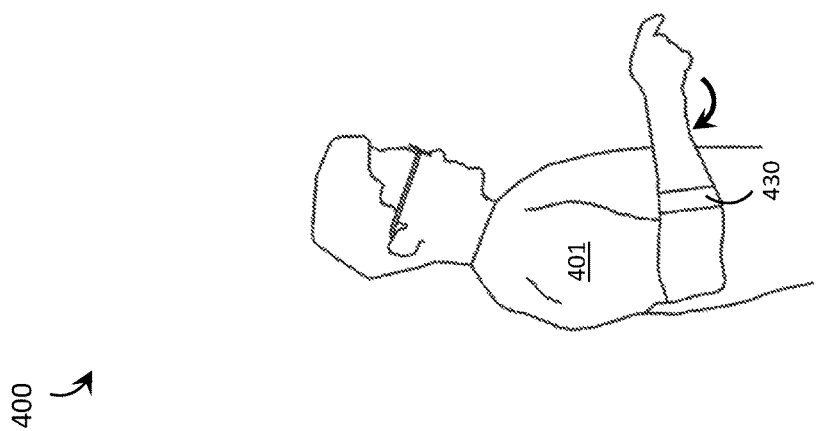

FIG. 4C is an illustrative diagram showing a third stage of the exemplary lecture or presentation 400 from FIGS. 4A and 4B. In the illustration of FIG. 4C, a digital copy image of the content that was displayed at a first magnification level on electronic display 410 in FIGS. 4A and 4B is displayed at a first "intermediate" magnification level on electronic display 410. More specifically, only a portion of the content that was displayed at a first magnification level on electronic display 410 in FIGS. 4A and 4B is displayed as a digital copy image at a first intermediate magnification level in FIG. 4C, the portion including the region of the content on electronic display 410 that was overlaid by cursor 450 in FIG. 4B. The first intermediate magnification level is greater than the first magnification level but is less than the second magnification level reached at the end of the dynamic zoom (see FIG. 4F). The term "intermediate" is used in this context to indicate that the magnification level is a transitional magnification level briefly displayed as part of the dynamic zoom visual effect sequence from the first magnification level to the second magnification level. To this end, a small curved arrows near the arm of user 430 denotes that user 401 has partially rotated his/her arm in performance of the gesture representative of the magnification setting command. In the implementation of exemplary presentation 400, cursor 450 is not included in any digital copy images of the content; however, in alternative implementations cursor 450 may be included in one or more digital copy image(s) if desired.

Figure 4D:
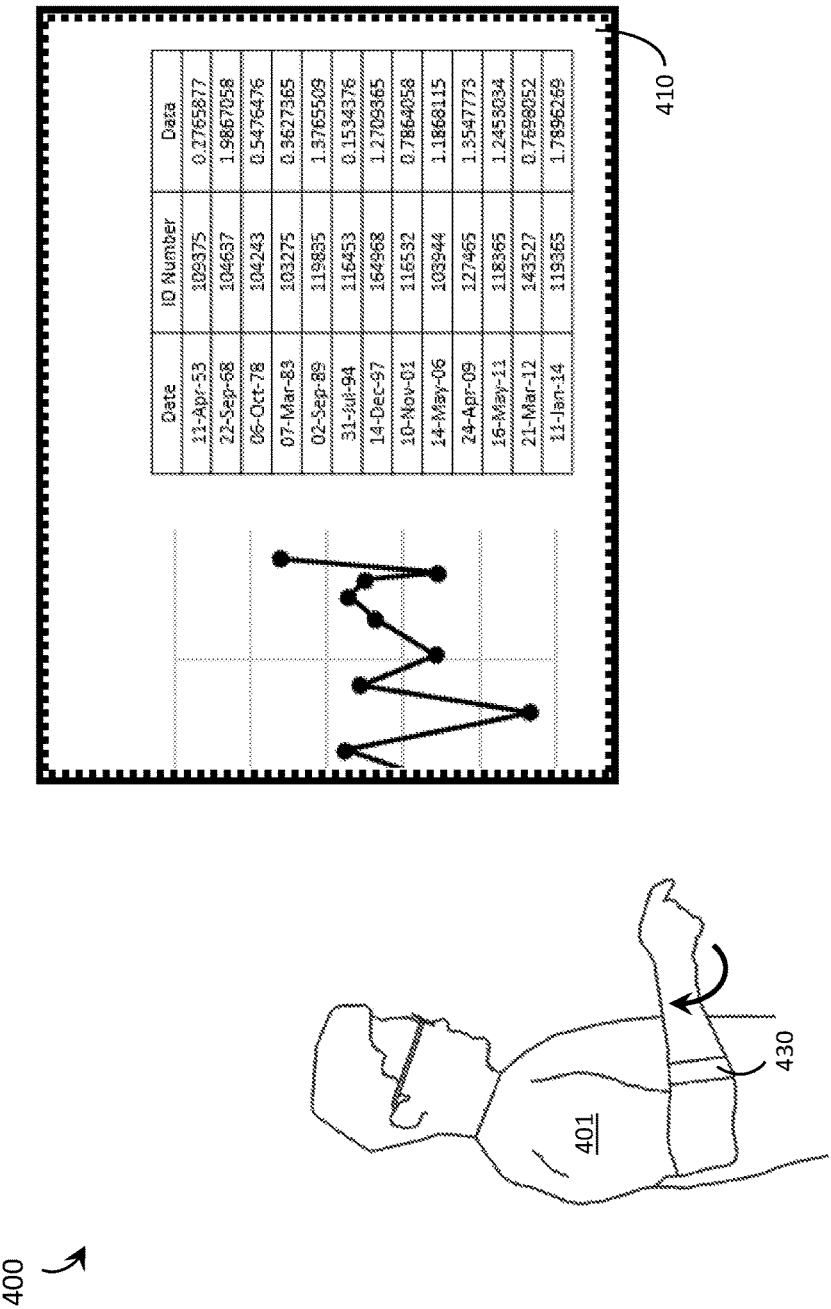
FIG. 4D is an illustrative diagram showing a fourth stage of the exemplary lecture or presentation from FIGS. 4A, 4B, and 4C.

FIG. 4D is an illustrative diagram showing a fourth stage of the exemplary lecture or presentation 400 from FIGS. 4A, 4B, and 4C. In the illustration of FIG. 4D, a digital copy image of the content that was displayed at a first magnification level on electronic display 410 in FIGS. 4A and 4B is displayed at a second intermediate magnification level on electronic display 410. More specifically, only a portion of the content that was displayed at a first magnification level on electronic display 410 in FIGS. 4A and 4B is displayed as a digital copy image at a second intermediate magnification level in FIG. 4D, the portion including the region of the content on electronic display 410 that was overlaid by cursor 450 in FIG. 4B. The second intermediate magnification level is greater than the first intermediate magnification level but is less than the second magnification level reached at the end of the dynamic zoom visual effect sequence (see FIG. 4F). The curved arrow near the arm of user 401 in FIG. 4D is larger than the curved arrow near the arm of user 401 in FIG. 4C to represent that user 401 has completed more of a rotation of his/her arm at the instant in time depicted in FIG. 4D compared to the instant in time depicted in FIG. 4C.

Figure 4E:
FIG. 4E is an illustrative diagram showing a fifth stage of the exemplary lecture or presentation from FIGS. 4A, 4B, 4C, and 4D.
Figure 4E:
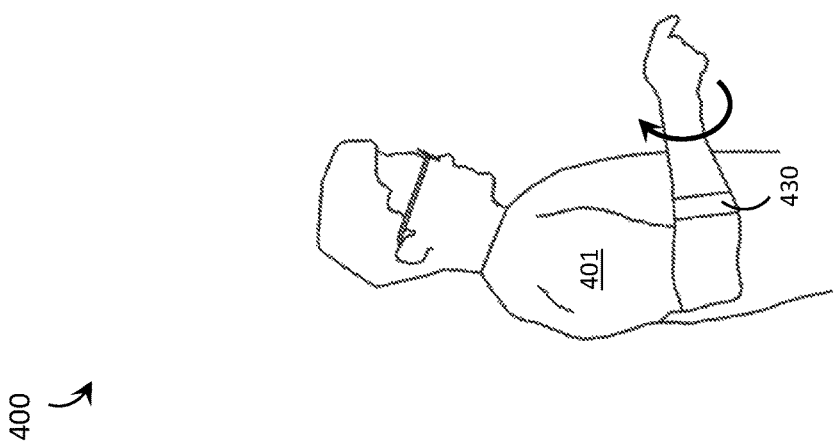

FIG. 4E is an illustrative diagram showing a fifth stage of the exemplary lecture or presentation 400 from FIGS. 4A, 4B, 4C, and 4D. In the illustration of FIG. 4E, a digital copy image of the content that was displayed at a first magnification level on electronic display 410 in FIGS. 4A and 4B is displayed at a third intermediate magnification level on electronic display 410. More specifically, only a portion of the content that was displayed at a first magnification level on electronic display 410 in FIGS. 4A and 4B is displayed as a digital copy image at a third intermediate magnification level in FIG. 4E, the portion including the region of the content on electronic display 410 that was overlaid by cursor 450 in FIG. 4B. The third intermediate magnification level is greater than the second intermediate magnification level but is less than the second magnification level reached at the end of the dynamic zoom visual effect sequence (see FIG. 4F). The curved arrow near the arm of user 401 in FIG. 4E is larger than the curved arrow near the arm of user 401 in FIG. 4D to represent that user 401 has completed more of a rotation of his/her arm at the instant in time depicted in FIG. 4E compared to the instant in time depicted in FIG. 4D.

Figure 4F:
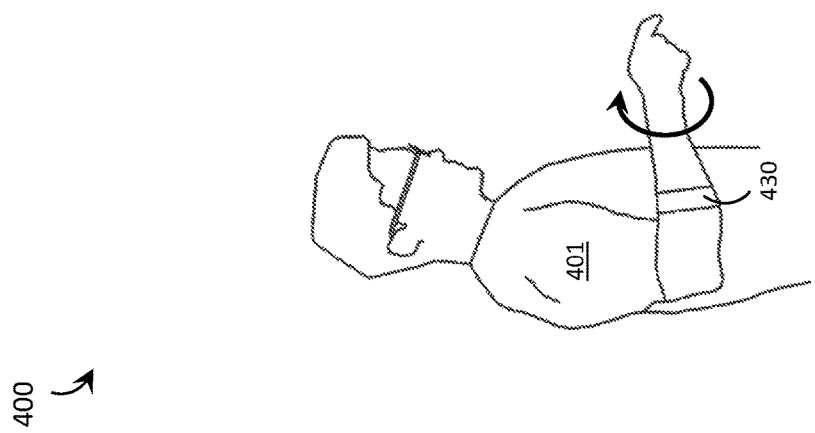
FIG. 4F is an illustrative diagram showing a sixth stage of the exemplary lecture or presentation from FIGS. 4A, 4B, 4C, 4D, and 4E.

FIG. 4F is an illustrative diagram showing a sixth stage of the exemplary lecture or presentation 400 from FIGS. 4A, 4B, 4C, 4D, and 4E. In the illustration of FIG. 4F, a digital copy image of the content that was displayed at a first magnification level on electronic display 410 in FIGS. 4A and 4B is displayed at a second magnification level on electronic display 410. More specifically, only a portion of the content that was displayed at a first magnification level on electronic display 410 in FIGS. 4A and 4B is displayed as a digital copy image at a second magnification level in FIG. 4F, the portion including the region of the content on electronic display 410 that was overlaid by cursor 450 in FIG. 4B. The second magnification level is greater than the first magnification level and greater than all intermediate magnification levels (i.e., the first, the second, and the third intermediate magnification levels) displayed "en route" from the first magnification level to the second magnification level during the dynamic zoom visual effect sequence. The curved arrow near the arm of user 401 in FIG. 4F is larger than the curved arrow near the arm of user 401 in FIG. 4E to represent that user 401 has completed more of a rotation of his/her arm at the instant in time depicted in FIG. 4F compared to the instant in time depicted in FIG. 4E.

Cumulatively, FIGS. 4A through 4F depict an illustrative example in which a presentation implements the present systems, methods, and computer program products to enhance an otherwise conventional presentation experience by incorporating gesture-controlled pointer and dynamic zoom functionalities not otherwise available in the conventional presentation software being used.

Throughout this specification, reference is often made to "conventional presentation software" and "enhancing" or otherwise adapting conventional presentation software. The use of a borderless application window that is transparent to both content and a majority of events is an aspect of the present systems, methods, and computer program products that is particularly well-suited to enable the present systems, methods, and computer program products to be used in conjunction with, and enhance, conventional presentation software. The borderless application window is further compatible for use in conjunction with virtually any displayed content; thus, a user may trigger a pointer and zoom in on the pointer position even when no conventional presentation software is running (e.g., the user may display a pointer on and then zoom in on their desktop, or virtually any application window displayed on an electronic display, such as for example a map application, a database or spreadsheet application, or a web browser). However, one or more variation(s) of the present systems, methods, and computer program products may also be implemented in dedicated presentation software that may or may not incorporate the use of a borderless application window as described herein.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 62/152,151, US Patent Publication US 2014-0240103 A1, US Patent Publication US 2015-0057770 A1, US Patent Publication US 2015-0070270 A1, U.S. Non-Provisional patent application Ser. No. 14/658,552 (now US Patent Publication US 2015-0261306 A1), and/or U.S. Non-Provisional patent application Ser. No. 14/679,850 (now US Patent Publication US 2015-0296553 A1), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a display system which comprises at least one processor, an electronic display communicatively coupled to the at least one processor, and at least one non-transitory processor-readable storage medium communicatively coupled to the at least one processor, wherein the at least one non-transitory processor-readable storage medium stores at least one of processor-executable instructions and data, the method comprising:
   causing, by the at least one processor, a display of content at a first magnification level on the electronic display;
   receiving, by the at least one processor, a user input indicative of a magnification setting command;
   in response to the user input indicative of the magnification setting command:
   capturing, by the at least one processor, a digital copy image of the content;
   digitally magnifying, by the at least one processor, at least a portion of the digital copy image of the content;
   causing, by the at least one processor, an overlay of a borderless window over top of at least a portion of the display of content at the first magnification level on the electronic display, wherein the borderless window is transparent to both content and a majority of events;
   causing, by the at least one processor, a display of the digitally magnified at least a portion of the digital copy image of the content at a second magnification level in the borderless window over top of at least a portion of the display of content at the first magnification level on the electronic display, the second magnification level greater than the first magnification level.

2. The method of claim 1 wherein capturing, by the at least one processor, a digital copy image of the content includes capturing, by the at least one processor, a screenshot of the content.

3. The method of claim 1 wherein:
digitally magnifying, by the at least one processor, at least a portion of the digital copy image of the content includes producing, by the at least one processor, a series of digital copy images of respective portions of the content at successive magnification levels; and
causing, by the at least one processor, a display of the digitally magnified at least a portion of the digital copy image of the content at a second magnification level in the borderless window over top of at least a portion of the display of content at the first magnification level on the electronic display includes causing, by the at least one processor, a sequential display of the series of digital copy images of respective portions of the content at successive magnification levels in the borderless window over top of at least a portion of the display of content at the first magnification level on the electronic display.

4. The method of claim 1, further comprising:
receiving, by the at least one processor, a user input indicative of a display restoration command; and
in response to the user input indicative of the display restoration command:
stopping, by the at least one processor, the display of the digitally magnified at least a portion of the digital copy image of the content at a second magnification level in the borderless window over top of at least a portion of the display of content at the first magnification level on the electronic display.

5. The method of claim 4 wherein causing, by the at least one processor, a display of the digitally magnified at least a portion of the digital copy image of the content at a second magnification level in the borderless window over top of at least a portion of the display of content at the first magnification level on the electronic display includes causing, by the at least one processor, the digitally magnified at least a portion of the digital copy image of the content to completely overlay the display of content at the first magnification level and stopping by the at least one processor, the display of the content at the first magnification level on the electronic display, and wherein the method further comprises:
in response to the user input indicative of the display restoration command:
causing, by the at least one processor, a resumption of the display of the content at the first magnification level on the electronic display.

6. The method of claim 4 wherein:
digitally magnifying, by the at least one processor, at least a portion of the digital copy image of the content includes producing, by the at least one processor, a series of digital copy images of respective portions of the content at successively greater magnification levels; and
stopping, by the at least one processor, a display of the digitally magnified at least a portion of the digital copy image of the content at a second magnification level in the borderless window over top of at least a portion of the display of content at the first magnification level on the electronic display includes causing, by the at least one processor, sequential display of the series of digital copy images of respective portions of the content at successively lesser magnification levels in the borderless window over top of at least a portion of the display of content at the first magnification level on the electronic display.

7. The method of claim 1 wherein the display system further comprises a portable control device, the method further comprising:
  detecting, by the portable control device, the user input indicative of the magnification setting command;
  in response to detecting, by the portable control device, the user input indicative of the magnification command, transmitting a first signal by the portable control device; and
  receiving the first signal by the at least one processor.

8. The method of claim 7 wherein the portable control device includes a gesture-based control device and wherein detecting, by the portable control device, the user input indicative of the magnification setting command includes detecting, by the gesture-based control device, a first physical gesture performed by a user of the display system.

9. The method of claim 1, further comprising:
  receiving, by the at least one processor, a user input indicative of a pointer command;
  in response to the user input indicative of the pointer command:
  causing, by the at least one processor, a display of a dynamic cursor in the borderless window over top of a portion of the display of content at the first magnification level on the electronic display, and wherein:
  digitally magnifying, by the at least one processor, at least a portion of the digital copy image of the content includes digitally magnifying, by the at least one processor, at least the portion of the content over which the dynamic cursor is displayed.

10. A display system comprising:
  an electronic display;
  at least one processor communicatively coupled to the electronic display; and
  at least one non-transitory processor-readable storage medium communicatively coupled to the at least one processor, wherein the at least one non-transitory processor-readable storage medium stores at least one of processor-executable instructions and data that, when executed by the at least one processor, cause the display system to:
  display a content at a first magnification level on the electronic display; and
  in response to a user input indicative of a magnification setting command:
  capture a digital copy image of the content;
  digitally magnify at least a portion of the digital copy image of the content;
  overlay a borderless window over top of at least a portion of the display of the content at the first magnification level on the electronic display, wherein the borderless window is transparent to both content and a majority of events; and
  display the digitally magnified at least a portion of the digital copy image of the content at a second magnification level in the borderless window over top of at least a portion of the display of the content at the first magnification level on the electronic display, the second magnification level greater than the first magnification level.

11. The display system of claim 10 wherein, in response to a user input indicative of a magnification setting command, when executed by the at least one processor, the at least one of processor-executable instructions and data cause the display system to:
  digitally magnify at least a portion of the digital copy image of the content cause the display system to produce a series of digital copy images of respective portions of the content at successive magnification levels, and
  sequentially display the series of digital copy images of respective portions of the content at successive magnification levels in the borderless window over top of at least a portion of the display of the content at the first magnification level.

12. The display system of claim 10 wherein, when executed by the at least one processor, the at least one of processor-executable instructions and data further cause the display system to:
  in response to a user input indicative of a display restoration command:
  stop displaying the digitally magnified at least a portion of the digital copy image of the content at a second magnification level in the borderless window over top of at least a portion of the display of the content at the first magnification level on the electronic display.

13. The display system of claim 10, further comprising:
  a portable control device responsive to at least the user input indicative of the magnification setting command, wherein in response to the user input indicative of the magnification setting command the portable control device transmits at least one signal to the at least one processor.

14. The display system of claim 13 wherein the portable control device includes a gesture-based control device responsive to at least a first physical gesture performed by a user of the display system.

15. The display system of claim 10 wherein, when executed by the at least one processor, the at least one of processor-executable instructions and data further cause the display system to:
  in response to a user input indicative of a pointer command:
  display a dynamic cursor in the borderless window over top of a portion of the display of the content at the first magnification level on the electronic display, and
  in response to a user input indicative of a magnification setting command:
  digitally magnify at least the portion of the content over which the dynamic cursor is displayed.

16. A non-transitory processor-readable storage medium of a digital computer system, comprising:
  at least one of processor-executable instructions and data that, when executed by at least one processor of the digital computer system, cause the digital computer system to:
  display a content at a first magnification level on an electronic display; and
  in response to a user input indicative of a magnification setting command:
  capture a digital copy image of the content;
  digitally magnify at least a portion of the digital copy image of the content;
  overlay a borderless window over top of at least a portion of the display of the content at the first magnification level on the electronic display, wherein the borderless window is transparent to both content and a majority of events; and
  display the digitally magnified at least a portion of the digital copy image of the content at a second magnification level in the borderless window over top of at least a portion of the display of the content at the first magnification level on the electronic display, the second magnification level greater than the first magnification level.

17. The non-transitory processor-readable storage medium of claim 16 wherein the at least one of processor-executable instructions and data that, when executed by the at least one processor of the digital computer system, cause the digital computer system to, in response to a user input indicative of a magnification setting command, digitally magnify at least a portion of the digital copy image of the content cause the digital computer system to produce a series of digital copy images of respective portions of the content at successive magnification levels, and wherein the at least one of processor-executable instructions and data that, when executed by the at least one processor of the digital computer system, cause the digital computer system to, in response to a user input indicative of a magnification setting command, display the digitally magnified at least a portion of the digital copy image of the content at a second magnification level in the borderless window over top of at least a portion of the display of the content at the first magnification level on the electronic display cause the digital computer system to sequentially display the series of digital copy images of respective portions of the content at successive magnification levels in the borderless window over top of at least a portion of the display of the content at the first magnification level on the electronic display.

18. The non-transitory processor-readable storage medium of claim 16, further comprising at least one of processor-executable instructions and data that, when executed by the at least one processor of the digital computer system, cause the digital computer system to, in response to a user input indicative of a display restoration command:
stop displaying the digitally magnified at least a portion of the digital copy image of the content at the second magnification level in the borderless window over top of at least a portion of the display of the content at the first magnification level on the electronic display.

19. The non-transitory processor-readable storage medium of claim 16, further comprising at least one of processor-executable instructions and data that, when executed by the at least one processor of the digital computer system, cause the digital computer system to, in response to a user input indicative of a pointer command:
display a dynamic cursor in the borderless window over top of a portion of the display of the content at the first magnification level on the electronic display, and wherein the at least one of processor-executable instructions and data that, when executed by the processor of the digital computer system, cause the digital computer system to, in response to a user input indicative of a magnification setting command, digitally magnify at least a portion of the digital copy image of the content cause the display system to digitally magnify at least the portion of the content over which the dynamic cursor is displayed.

* * * * *